3,565,579
RECOVERY OF MAGNESIUM CHLORIDE DIHYDRATE

Richard L. Craig, E. A. Hunter, and Evan A. Mayerle, Lake Jackson, and Virgil L. Seale, Houston, Tex., assignors to Nalco Chemical Company, Chicago, Ill., a corporation of Delaware
No Drawing. Filed Nov. 18, 1968, Ser. No. 776,793
Int. Cl. C01f 5/30, 5/34
U.S. Cl. 23—91                                5 Claims

ABSTRACT OF THE DISCLOSURE

In the so-called "Nalco-Freeport" process for the production of organolead compounds by the electrolytic decomposition of a sacrificial lead anode utilizing a mixture of anhydrous oxygenated solvents consisting preferably of the diethylether of tetraethylene glycol (DETEG) and tetrahydrofuran (THF) in the operable ratio of 25–50/75–50; a preferred ratio of 30–40/70–60 and an optimum value of 35/65 by weight percent, with the consequent byproduction of anhydrous magnesium chloride ($MgCl_2$), the step and improvement which consists of separating and recovering magnesium values by treatment of the magnesium chloride with stoichiometric amounts of water to form a magnesium chloride higher hydrate precipitate ($MgCl_2 \cdot xH_2O$ where $x$ equals about 4 to 6 mols of water per mol $MgCl_2$). A preferred species of titration agent comprises a ratio of $H_2O/THF$ of about 25–50/75–50, and an optimum ratio of about $H_2O/THF$ of 35/65 in weight percent, separating a higher hydrate precipitate from the solvent mix and recovering and heating higher hydrate at about 160–180° C. to remove water and reduce the hydration value, and recovering $MgCl_2 \cdot 2H_2O$, the commercial dihydrate which is input to a cell for the production of magnesium metal.

---

In the early 1960's, a new process for the production of organolead compounds was invented and made commercially practicable at the Nalco-Freeport, Tex., plant of the Nalco Chemical Company, and has come to be termed the "Nalco-Freeport" process. Cf. Kirk-Othmer II, The Encyclopedia of Chemical Technology, volume 12, pages 292–293 (1967). Differing from prior art processes, this new process used a sacrificial lead anode with anhydrous magnesium Grignard reagent and excess alkyl halide as input according to the overall equation given below for tetramethyl lead:

$$2CH_3MgCl + 2CH_3Cl + Pb \ldots (CH_3)_4Pb + 2MgCl_2$$

The process may be generalized as follows:

$$2RMgCl + 2R'Cl + Pb \ldots (RR')_2Pb + 2MgCl_2$$

where R and R' are preferably lower alkyl, alkylene, and the like. R and R' may be similar as with the production of tetramethyl lead or dissimilar to produce mixed organolead compounds, as for example dimethyldivinyllead. R is usually termed the organo Grignard substituent and R' is usually termed the scavenger substituent.

In a similar fashion to tetramethyl lead above, tetraalkyl lead, mixed alkyls such as the dimethyldiethyl variety and mixed alkyl-alkylenes such as diethyldivinyl lead may be produced. In general, the lower molecular weight substituents (l.m.w.) where C=1–3 have been found most useful for antidetonant compositions in gasoline.

The Nalco-Freeport process had the great advantage of utilizing lead in its entirety as the sacrificial anode where prior art used only a part of the lead, but a commercial problem remained in that the magnesium chloride by-product provided difficulties in separation. Also, since the magnesium was more costly than the sodium utilized by competitive processes, it was important to fully utilize the $MgCl_2$ byproduct to make the process commercially competitive. The equation goes to the right with the absence of magnesium interference due to excess alkyl halide introduced to recombine with any magnesium side reaction, and the patent position in part as to this process is illustrated by the following patents: U.S. 3,007,858—Braithwaite (Nalco), U.S. 3,-380,899—Braithwaite et al. (Nalco), U.S. 3,393,137—Altman et al. Nalco).

The permissible anhydrous solvent solution utilized in the present invention includes and incorporates by reference those solvents designated as water miscible diethers of glycol and set out at column 2, lines 15 through 19 of U.S. 3,393,137 ante.

In addition to the Nalco assigned patents noted above, the patented art believed most pertinent to the present invention is as follows:

U.S. 1,871,428—Smith (Dow)—the magnesium chloride hexahydrate is dehydrated to the tetrahydrate and below by boiling at 169°–193° C. Patentee may also utilize freezing and flaking at 180° C.

U.S. 2,381,994—Belchetz (Kellogg)—preparing anhydrous magnesium chloride from the hexahydrate form by utilizing as a solvent a saturated monohydroxy aliphatic alcohol (e.g., pentanol) and distilling off water.

U.S. 3,357,800—Gaska (Dow)—recovery of the dihydrate and tetrahydrate of magnesium chloride by preferential extraction utilizing a selective alcohol solvent such as methanol or ethanol at 0–50° C.

Later research in this field since the early Braithwaite patents showed that commercially the optimum anhydrous solvent was a mixture of ethers and of these a synergistic combination of a glycol-oxycyclic mix of DETEG/THF was found to show increased efficiency as to organolead production. It was also found that for the best results the following ratios should be observed as to the weight percent of DETEG/THF: an operable ratio of about 25–50/75–50; a preferred ratio of about 30–40/70–60, and an optimum value of about 35/65.

As alternatives for the glycol component in the solvent mix, there is preferred the water miscible diether of polyalkylene glycols such as the symmetrical dimethyl, diethyl, dipropyl and analogous mixed diloweralkyl ethers such as methyl ethyl ethers of di-, tri-, tetra- and pentaethylene glycol ethers.

However, it was found that the problem of separating the magnesium chloride byproduct from the ether solvents in the effluent from the electrolytic cell was still a major stumbling block for commercial competition with other processes. It has now been found that the recovery of the magnesium chloride may be achieved in this process by treatment of the electrolyzed cell effluent with stoichiometric amounts of water so that the amount of water added to the magnesium chloride will be in the amount necessary to form the dihydrate $MgCl_2 \cdot 2H_2O$, the tetrahydrate $MgCl_2 \cdot 4H_2O$ and the hexahydrate $MgCl_2 \cdot 6H_2O$ and mixtures thereof as a readily definable granular precipitate.

A preferred refinement of the present technique is to add the water in a solution of THF wherein the THF is preferably in the dominant amount. The preferred ratios of water in THF are $H_2O/THF$ 25–50/75–50 by weight percent, and an optimum amount is $H_2O/THF$ of about 35/65 percent by weight. The product is readily removed from any DETEG contaminant by THF wash and heating which also removes any THF. In order to free the desired product, $MgCl_2 \cdot 2H_2O$, from the formed higher hydrate magnesium chloride, the higher hydrate is heated at about 160–180° C. for a period of about 6–10 hours, resulting in a commercial preparation $MgCl_2 \cdot 2H_2O$ which is useful for the production of magnesium by an electrolytic cell.

The term "magnesium chloride higher hydrate" and the term "higher hydrate" where used in this specification and claims are defined to mean magnesium chloride where the hydration value for the attached water has a value of about 6–4 mols water per mol of magnesium chloride, corresponding with the known hexahydrate and tetrahydrate varieties. It has also been found that in this procedure minor amounts of the dihydrate may be formed and carried down with the precipitate as will minor amounts of the hydrates with hydration values greater than 6, but the predominant varieties will be the hexahydrates and tetrahydrates.

Magnesium chloride forms hydrates of 2, 4, 6, 8 and 12 molecules of hydration but in the present process the 4 and 6 varieties predominate and in the dehydration step, the effort is made to reduce the hydration value from a higher hydrate to a value of 2. The resulting dihydrate has more favorable packing qualities and shows less caking and coalescing crystalline structure than is noted with the higher hydrates such as the hexahydrate, $MgCl_2 \cdot 6H_2O$.

In this specification and claims, the following abbreviations have the meanings as described:
DETEG=diethylether of tetraethylene glycol.
THF=tetrahydrofuran.

EXAMPLE 1A

Into each of three 10 liter containers were added 10 mols of magnesium chloride (anhydrous) effluent from a Nalco-Freeport electrolytic cell for the production of tetramethyl lead. The effluent utilized had been passed through an "E–1A stripper" which is a stripping column for removal of a majority of the alkyl halide carryover and the present feed is designated "E–1A bottoms."

The containers were fitted with conventional stirring devices and 2, 4 and 6 mols of water per mol $MgCl_2$ were added individually to the three containers, with stirring. Precipitates of crystalline, grainy appearance formed in each case but quantitative yield of magnesium chloride hydraate formed only with the containers to which 4 and 6 mols of water were added. Additionally, it was noted that the 4 and 6 varieties had a more crystalline appearance and on washing with THF the removal of impurities was superior. Filtration, washing and analysis of the precipitates by thermal means indicated that the water of hydration approximated the correct percentage in each case, e.g., $MgCl_2 \cdot 4H_2O$ and $MgCl_2 \cdot 6H_2O$ for the two superior precipitates. Analysis of the effluent (filtrate) from the tetrahydrate and hexahydrate showed Mg value removal of 93.2% and 92.6%, respectively.

EXAMPLE 1B

The procedure of Example 1A was followed with the exception that a series of runs was made in which a mixed water/THF solution was used to effect the hydrate precipitation. The technique was modified by adding water generally as a minority percent in THF and a series was made in which the weight percent $H_2O$/THF was 10, 25, 35, 50 and 75. It was again observed that where the stoichiometric amount of combined $H_2O$ and THF were 4 to 6 with respect to the anhydrous magnesium chloride, that in the ratio $H_2O$/THF the range 25 to 50% by weight of $H_2O$ gave enhanced results as far as the crucial granular character of the precipitate and the percent recovery of magnesium in the range was superior to the runs outside the preferred range, i.e., superior to the runs where 10% and 75% $H_2O$ was used. In this range, which showed an optimum result at about 35% $H_2O$/THF in weight percent, there was a recovery of 96% average for magnesium values, with essentially complete removal of magnesium from the ether solution.

EXAMPLE 2A

Three 2 kilo samples of the grainy tetrahydrate and hexahydrate precipitates from Example 1A were placed sequentially in a furnace and heated for 6 hours at (a) 160° C.; (b) 170° C., and (c) 180° C. The measurement of each sample at the end of the heating period indicated that the water of hydration had been reduced to $2H_2O$.

EXAMPLE 2B

In the same manner as Example 2A above, sample precipitates were obtained utilizing the tetrahydrate and hexahydrate products of Example 1B, using water/THF mixtures as the titrating agent, and again the results showed that reduction to the commercially utilizable dihydrate was obtained by heating in the range of about 160–180° C. Additional procedures established that the optimum heating period was from about 6 to 10 hours.

EXAMPLE 3

Variation of molar water of titration to form hydrates

Water was added to a synthetic cell effluent to precipitate $MgCl_2 \cdot xH_2O$. A high speed stirrer (Stir-O-Vac) was used to get good mixing and the time required for addition of the water was held essentially constant (15 minutes). After 15 minutes of stirring beyond the addition, the reaction mixture was filtered through a fritted filter, by vacuum.

It was noted below that the runs wherein $(\cdot xH_2O)$ $x$ was in the range 4 to 6 or tetrahydrate-hexahydrate showed consistent satisfactory minimal Mg retained in the filtrate whereas where $x$ was 2.2 approaching the dihydrate there was a sharp rise in the value of Mg in the filtrate.

Water precipitation of $MgCl_2$ from synthetic mixture

Synthetic mixture:
OH—<0.01 mmole/g.
Mg—1.82 mmole/g.
Cl—3.58 mmole/g.
THF—54.8 wt. percent
DETEG—45.2 wt. percent

| Moles $H_2O$/mole Mg | 4.0 | 5.5 | 2.2 | 4.0 |
|---|---|---|---|---|
| Percent $H_2O$ in THF used for precipitation | 50 | 50 | 50 | 50 |
| Time of addition, minutes | 15 | 15 | 15 | 14 |
| Maximum temperature of addition, ° C. | 60 | 62 | 58 | 62 |
| Time required for filtration, minutes | 10 | 5 | 5–10 | 5–10 |
| Temperature, ° C., at start filtration | 44 | 48 | 50 | 45 |
| Filtrate: | | | | |
| Mg, mmole/g | <0.01 | <0.01 | <0.20* | <0.01 |
| $H_2O$, p.p.m. (KF) | Nil | 546 | 521* | 124 |
| Activity | 24 | 27 | 33* | 25 |
| Appearance | (¹) | (²) | (³) | (¹) |
| Solids: | | | | |
| Mg, mmole/g | 4.63 | 4.59 | 2.75 | 4.40 |
| THF, weight percent | 10.6 | 6.0 | 49.7 | 17.8 |
| DETEG, weight percent | 12.3 | 10.6 | 18.4 | 10.9 |
| Appearance | (⁴) | (⁴) | (⁵) | (⁴) |

* Analysis on clear supernatant.
¹ Clear sparkling.
² Clear, but solids pptd. on standing.
³ Solids precipitated in 1 hour.
⁴ Finely divided.
⁵ Like a sol or gel; cake cracked.

EXAMPLE 4

Variation of $H_2O$/THF precipitating solution

Multiple samples of spent Grignard (cell effluent) were treated with varying amounts of water, using a 600 r.p.m. paddle stirrer. The resultant solids were filtered (in a dry box) through a fritted filter.

Analysis of the cell effluent was:
OH—0.10 mmoles/g.
Mg—1.17 mmoles/g.
Cl—2.25 mmoles/g.
Pb—0.51 mmoles/g.
THF/DETEG—55/45 wt. percent
Et Cl—10.5 wt. percent

| Moles H₂O/mole Mg | 4.5 | 6.0 | 4.5 |
|---|---|---|---|
| Percent H₂O in THF | 36 | 50 | 100 |
| Filtrate | (1) | (2) | (3) |
| Solids: | | | |
| Mg, mmole/g | 3.83 | 3.66 | 2.98 |
| Pb, mmole/g | 0.19 | 0.18 | 0.25 |
| THF, weight percent | 22.8 | 19.2 | 34.9 |
| DETEG, weight percent | 8.1 | 9.5 | 13.1 |
| Appearance | (4) | (5) | (6) |

1 Clear, sparkling; hazy after ½ hour.
2 Clear, sparkling after 4 hours.
3 Clear, hazy in ½ hour.
4 White-fine granular.
5 Very granular grayish.
6 Mixed—some fine white—some gray granular.

The data above suggests that increasing the ratio $H_2O/THF > 50/50$ by weight percent gives less than favorable results with decreased Mg recovery and increased Pb carryover. Additional examples showed that a preferred range existed for the combination which was $H_2O/THF = 25-50/75-50$.

The embodiments of the invention in which an exclusive property or privilege is claimed are defined as follows:

1. In the electrolytic production of organolead compounds from a magnesium Grignard reagent, excess alkyl halide and a sacrificial lead anode, utilizing as a solvent a mixture of diethylether of tetraethylene glycol (DETEG) and tetrahydrofuran (THF) in the operable ratio of 25–50/75–50 by weight percent, producing alkyl lead product and an effluent byproduct comprising magnesium chloride in a non-aqueous mixed ether solvent, the step which consists of treating said effluent with stoichiometric amounts of water by means of a treating agent selected from water and a mixture of water and tetrahydrofuran to precipitate magnesium chloride byproduct as magnesium chloride higher hydrate ($MgCl_2 \cdot xH_2O$, where $x$ equals 4 or 6), together with a clear, sparkling effluent, recovering and separating said higher hydrate precipitate and dehydrating said precipitate to $MgCl_2 \cdot 2H_2O$ by heating said precipitate at a temperature of about 160–180° C. for about 6–10 hours.

2. The process according to claim 1 wherein the precipitating agent is $H_2O$.

3. The process according to claim 1 wherein the precipitating agent is a mixture of $H_2O$ and THF, wherein the ratio of $H_2O$/THF is about 25–57/75–50 by weight percent.

4. The process according to claim 1 wherein the precipitating agent is a mixture of $H_2O$ and THF wherein the ratio of $H_2O$/THF is about 35/65 by weight percent.

5. The process according to claim 1 wherein the magnesium chloride higher hydrate precipitate is dehydrated to $MgCl_2 \cdot 2H_2O$ by heating said precipitate at a temperature of about 170° C. for about 8 hours.

References Cited

UNITED STATES PATENTS

| | | | |
|---|---|---|---|
| 1,479,982 | 1/1924 | Collings et al. | 23—91 |
| 1,800,589 | 4/1931 | Barstow et al | 23—91X |
| 1,835,818 | 12/1931 | Smith et al. | 23—91 |
| 1,874,735 | 8/1932 | Barstow et al. | 23—91 |
| 2,381,994 | 8/1945 | Belchetz | 23—91 |
| 2,417,772 | 3/1947 | Marek | 23—91 |
| 3,336,107 | 8/1967 | Kimberlin, Jr. | 23—91 |
| 3,380,900 | 4/1968 | Braithwaite et al. | 204—59 |
| 3,395,977 | 8/1968 | Nadler | 23—91 |

OTHER REFERENCES

McPherson & Henderson book: "A Course in General Chemistry," 3rd Ed., 1927, p. 549, Ginn & Co., N.Y.

EDWARD STERN, Primary Examiner

U.S. Cl. X.R.

204—59, 70